United States Patent
Edelmann et al.

(10) Patent No.: US 6,251,989 B1
(45) Date of Patent: *Jun. 26, 2001

(54) OLIGOMERIZED ORGANOPOLYSILOXANE COCONDENSATE, ITS PRODUCTION AND ITS USE FOR TREATMENT OF SURFACES

(75) Inventors: Roland Edelmann, Wehr; Albert-Johannes Frings, Rheinfelden; Michael Horn, Rheinfelden; Peter Jenkner, Rheinfelden; Eckhard Just, Rheinfelden; Manfred Kaussen, Aachen; Ralf Laven, Schwoerstadt; Helmut Lohmann, Krefeld; Helmut Mack; Jaroslaw Monkiewicz, both of Rheinfelden; Stephan Ramlow, Krefeld; Burkhard Standke, Loerrach; Tilman Taeger, Seeheim-Jugenheim, all of (DE)

(73) Assignee: Degussa-Huels Aktiengesellschaft, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,839

(22) Filed: May 26, 1999

(30) Foreign Application Priority Data

May 26, 1998 (DE) ................................. 198 23 390

(51) Int. Cl.$^7$ ................. C08G 77/18; C08G 77/26; C08G 77/24
(52) U.S. Cl. ............. 524/837; 524/858; 528/38; 528/42; 556/425; 556/482
(58) Field of Search ............ 528/38, 42; 556/425, 556/482; 524/837, 858

(56) References Cited

U.S. PATENT DOCUMENTS

| | | |
|---|---|---|
| 5,424,130 | 6/1995 | Nakanishi et al. . |
| 5,498,657 | 3/1996 | Sugiyama et al. . |
| 5,629,400 | 5/1997 | Standke et al. . |
| 5,679,147 | 10/1997 | Standke et al. . |
| 5,808,125 | 9/1998 | Standke et al. . |
| 5,849,942 | 12/1998 | Standke et al. . |
| 5,863,509 | 1/1999 | Standke et al. . |
| 5,885,341 | 3/1999 | Standke et al. . |
| 6,054,601 | * 4/2000 | Standke et al. . |

FOREIGN PATENT DOCUMENTS

| | | |
|---|---|---|
| 196 49 953 | 6/1998 | (DE) . |
| 196 49 954 | 6/1998 | (DE) . |
| 196 49 955 | 6/1998 | (DE) . |
| 0 846 716 | 6/1989 | (EP) . |
| 0 491 251 | 6/1992 | (EP) . |
| 0 493 747 | 7/1992 | (EP) . |
| 0 629 673 | 12/1994 | (EP) . |
| 0 658 525 | 6/1995 | (EP) . |
| 0 846 717 | 6/1998 | (EP) . |

OTHER PUBLICATIONS

Watakabe Atsushi et al., "Organosol Dispersed in Fluorine–Containing Solvent", Patent Abstracts of Japan, Publication No. 07112126, May 2, 1995.
Gunji Fumiaki et al., "Water–Repellent/Oil–Repellent Porous Silica Particle and Water–Repellent/Oil–Repellent Coating Film"Patent Abstracts of Japan, Publication No. 08157643, Jun. 18, 1996.
Yamamoto Toru et al., "Production of Water–Repellent Article", Patent Abstracts of Japan, Publication No. 08026774, Jan. 30, 1996.
Kondo Takeshi et al., "Water–Repellent Glass and Its Production", Patent Abstracts of Japan, Publication No. 08040748, Feb. 13, 1996.
Nakanishi Masaji, "Formation of Fluoroplastic Film", Patent Abstracts of Japan, Publication No. 07232399, Sep. 5, 1995.
Ueda Masahiro et al., "Composition", Patent Abstracts of Japan, Publication No. 07238229, Sep. 12, 1995.
Takahashi Osamu et al., "Water Repellent Glass", Patent Abstracts of Japan, Publication No. 07138047, May 30, 1995.
Hiraoka Soichiro et al., "Stainproof Telephone Box", Patent Abstracts of Japan, Publication No. 07289985, Nov. 7, 1995.
Tada Hiroaki et al., "Water–Repellent Article and Production Thereof", Patent Abstracts of Japan, Publication No. 07257943, Oct. 9, 1995.

* cited by examiner

Primary Examiner—Robert Dawson
Assistant Examiner—Kuo-Liang Peng
(74) Attorney, Agent, or Firm—Oblon, Spivak, McClelland, Maier & Neustadt, P.C.

(57) ABSTRACT

An oligomerized polyorganosiloxane cocondensate which may be obtained, in part, by mixing an water-soluble amino-functional organosilane represented with at least one of the followoing: a fluoro-functional organosilane, an organosilane, and an organosilane. The cocondensate may be used, for example, in a method of treating surfaces.

17 Claims, No Drawings

OLIGOMERIZED ORGANOPOLYSILOXANE COCONDENSATE, ITS PRODUCTION AND ITS USE FOR TREATMENT OF SURFACES

BACKGROUND OF THE INVENTION

1. Field of the Invention

The present invention relates to an oligomerized organopolysiloxane cocondensate, which is optionally fluorofunctional, and soluble in water and/or alcohol, a process for producing the condensate, and a method of treating surfaces with the condensate.

2. Discussion of the Background

It is known that hydrophilic surfaces, especially ceramic, metallic, or glass surfaces can be hydrophobized by means of treatment with alkyl alkoxy silanes. Organosilanes which contain fluorine, with the general formula R'—Si(R")$_3$, with R' as a fluoridated organic radical and R" as a chlorine or alkoxy radical, find multiple uses for applying layers with both a hydrophobic and an oleophobic effect to surfaces. The coatings can also be used to apply dirt-repelling coatings to plate glass. The processes described are based on sol/gel processes, where micronized inorganic particles are used together with the fluoroalkyl silane. The application of such systems is technically complicated and mostly requires complex organic solvents and additives (see, for example, JA 07 112 126, JA 08 157 643, JA 08 026 774, JA 08 040 748, JA 07 232 399, JA 07 112 126, EP 0 658 525, JA 08 157 643, and EP 0 629 673).

Other complicated application methods, which produce intermediate layers on the substrate, are described in JA 07 238 229 and JA 07 138 047.

Significant amounts of organic solvents must be used in the production of oil-repelling and water-repelling coatings according to U.S. Pat. No. 5,424,130 (52 wt.-% ethanol), JA 07 289 985 (94 wt.-% isopropanol), and JA 07 257 943. Furthermore, processes are known which use ecologically undesirable solvents in significant amounts, for example chlorinated hydrocarbons or fluoro hydrocarbons (EP-A2 0 491 251 and EP-A2 0 493 747).

Some of the processes mentioned possess the disadvantage that after application of the coating agent, relatively high temperatures have to be applied in order to achieve the desired surface effect. The processes according to the German patent applications 196 49 953, 196 49 954, and 196 49 955 also require drying at temperatures >100° C. Various substrates, such as thermosensitive plastic surfaces, paper, furs, fabrics, or leather, are damaged at such high temperatures. Another disadvantage of the known systems and the older systems is that after they are acted on for an extended period of time by moisture, the desired surface effect is greatly reduced. This is expressed, for example, in the fact that glass plates which were treated with the system containing fluorine as described above and then had a strongly marked hydrophobic and oleophobic effect, demonstrate this effect only to a slight extent any longer after several hours of treatment in water (for example at the boiling temperature of water), or do not demonstrate it at all.

It was an important goal to develop silane-based systems which are soluble in an aqueous or an aqueous/alcoholic medium and which can be used to produce a hydrophobic and, if necessary, also an oleophobic coating on powdered, porous, or smooth flat or fiber substrates, using an easily performed impregnation process, at temperatures below 100° C., advantageously at room temperature, where the effect does not significantly decrease even after the coating has been acted on for an extended period of time by moisture.

The German patent application 196 49 954 discloses a fluoroalkyl-functional composition containing organopolysiloxane, on a water/alcohol basis, which is obtained by (a) mixing
water-soluble organosilanes with the general Formula I

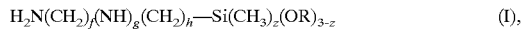

$$H_2N(CH_2)_f(NH)_g(CH_2)_h—Si(CH_3)_z(OR)_{3-z} \quad (I),$$

where $0 \leq f \leq 6$, $g=0$ if $f=0$ and $g=1$ if $f>1$, $0 \leq h \leq 6$, $0 \leq z \leq 1$, and R is a linear, branched, or cyclic alkyl group with 1 to 8 C atoms or an aryl group, with fluoroalkyl-functional organosilanes with the general Formula II

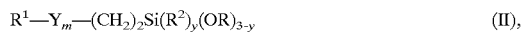

$$R^1—Y_m—(CH_2)_2Si(R^2)_y(OR)_{3-y} \quad (II),$$

where $R^1$ is a monofluoridated, oligofluoridated, or perfluoridated alkyl group with 1 to 9 C atoms or a monofluoridated, oligofluoridated, or perfluoridated aryl group, Y is a $CH_2$, O, or S group, $R^2$ is a linear, branched, or cyclic alkyl group with 1 to 8 C atoms or an aryl group, and R is a linear, branched, or cyclic alkyl group with 1 to 8 C atoms or an aryl group, $0 \leq y \leq 1$, and $m=0$ or 1, and possibly organosilanes with the general Formula III

$$R^3—Si(CH_3)(OR)_2 \quad (III)$$

and/or
organosilanes with the general Formula IV

$$R^3—Si(OR)_3 \quad (IV),$$

where here and in the preceding formula, $R^3$ is a linear, branched, or cyclic alkyl group with 1 to 8 C atoms, $R^3$, here or in the preceding formula, is the same or different in each instance, R, here or in the preceding formula, is a linear, branched, or cyclic alkyl group with 1 to 8 C atoms or an aryl group, and R is the same or different, in each instance, in the molar ratio $M=[a/(b+c+d)] \geq 0.1$, with $a>0$, $b>0$, $c>0$, $d>0$, where a is the sum of the mole numbers of the organosilanes according to Formula I, b is the sum of the mole numbers of the organosilanes according to Formula II, and c, if applicable, is the sum of the mole numbers of the organosilanes according to Formula III, and d, if applicable, is the sum of the mole numbers of the organosilanes according to Formula IV, (b) mixing the mixture with water or a water/acid mixture and/or a water/acid/alcohol mixture, (c) adjusting the pH value of the reaction mixture to a value between 1 and 8.

It was not surprisingly found that the above task can be advantageously accomplished if the composition according to the German patent application 196 49 954 is modified, if necessary, with regard to the combination of the starting substances of the general Formula I to IV, and in any case by adding an additional process step.

SUMMARY OF THE INVENTION

It is an object of the present invention to provide novel oligomerized organopolysiloxane cocondensates.

It is another object of the present invention to provide methods for making the oligomerized organopolysiloxane cocondensates.

It is another object of the present invention to provide methods of coating surfaces with the oligomerized organopolysiloxane cocondensates.

The objects of the invention, and others, may be accomplished with an oligomerized organopolysiloxane cocondensate, which is optionally fluoroalkyl-functional, and is dissolved in water and/or alcohol, which is obtained by:

(a) mixing
at least one water-soluble amino-functional organosilane with the general formula I

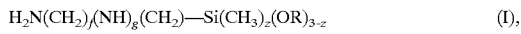

$$H_2N(CH_2)_f(NH)_g(CH_2)_h—Si(CH_3)_z(OR)_{3-z} \quad (I),$$

where f is equal to 0 or a whole number from 1 to 6, g is equal to 0 if f is equal to 0, and g is equal to 1 if f is not equal to 0; h is a whole number from 1 to 6, z stands for 0, 1 or 2, and R is a linear, branched, or cyclic alkyl group with 1 to 8 C atoms or an aryl group, with at-least one fluoro-functional organosilane with the general Formula II

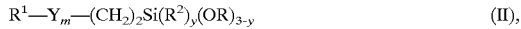

$$R^1—Y_m—(CH_2)_2Si(R^2)_y(OR)_{3-y} \quad (II),$$

where $R^1$ is a monofluoridated, oligofluoridated, or perfluoridated alkyl group with 1 to 9 C atoms or a monofluoridated, oligofluoridated, or perfluoridated aryl group, Y is a —$CH_2$—, —O—, or —S— group, $R^2$ stands for a linear, branched, or cyclic alkyl group with 1 to 8 C atoms or an aryl group, R is a linear, branched, or cyclic alkyl group with 1 to 8 C atoms or an aryl group, and y stands for 0 or 1 and m for 0 or 1, and/or with at least one organosilane with the general Formula III

$$R^3—Si(CH_3)(OR)_2 \quad (III),$$

and/or with at least one organosilane with the general Formula IV

$$R^3—Si(OR)_3 \quad (IV),$$

where in Formulas III and IV, $R^3$, independently in each instance, is a linear, branched, or cyclic alkyl group with 1 to 8 C atoms, R, independently in each instance, is a linear, branched, or cyclic alkyl group with 1 to 8 C atoms or an aryl group, in a molar ratio $M=[a/(b+c+d)] \geq 0.1$, where a is the sum of the mole numbers of the organosilanes according to Formula 1, b, if applicable, is the sum of the mole numbers of the organosilanes according to Formula II, c, if applicable, is the sum of the mole numbers of the organosilanes according to Formula III, and d, if applicable, is the sum of the mole numbers of the organosilanes according to Formula IV;

(b) mixing the mixture from above with water and with an acid, and, optionally, with an alcohol, (c) oligomerizing the cocondensate obtained in this way, thereby increasing the particle size.

The objects of the invention may also be accomplished with a process for the production of the oligomerized organopolysiloxane cocondensate, by:

(a) mixing the components I described with the component(s) II and/or III and/or IV, in the molar ratio M as described above;

(b) mixing the mixture from above with water and with an acid and, optionally, with an alcohol; and (c) oligomerizing the cocondensate obtained in this way, thereby increasing the particle size.

The objects of the invention may also be accomplished with the use of the organopolysiloxane cocondensates, which are optionally fluoroalkyl-functional, and are soluble in water and/or alcohol, (i) for hydrophobic and possibly additional oleophobic coating of surfaces, (ii) as parting agents, or (iii) for a dirt-repelling finish on surfaces.

A more complete appreciation of the invention and many of the attendant advantages thereof will be readily obtained as the same becomes better understood by reference to the following detailed description.

DETAILED DESCRIPTION OF THE INVENTION

The oligomerized polysiloxane cocondensates of the invention may be clear, aqueous, or aqueous/alcoholic systems, which contain the polysiloxane cocondensates, including the acid radicals. Differing from the composition according to the German patent application 196 49 954, the cocondensate formed by hydrolysis of the halogen and/or alkoxy groups and subsequent condensation of the silanol groups does not have to contain fluorine. The cocondensates according to the invention are always based on a water-soluble, amino-functional organosilane I, but there is freedom to choose with regard to the other components. Accordingly, the combinations I+II, I+III, I+IV, I+II+III, I+II+IV, as well as I+II+III+IV may be used in the present invention. If the cocondensate contains the fluoro-functional component II, the coating is certainly hydrophobic and, at the same time, oleophobic. If component II is missing, the coating is merely hydrophobic.

Suitable amino-functional organosilanes I are, for example, beta-aminoethyl trimethoxy silane, beta-aminoethyl triphenoxy silane, beta-aminoethyl methyl dimethoxy silane, beta-aminoethyl phenyl dimethoxy silane, beta-aminoethyl trimethoxy silane, beta-aminoethyl methyl dimethoxy silane, beta-aminoethyl triethoxy silane, (beta-aminoethylamino)-n-propyl ethyl triethoxy silane, (beta-aminoethylamino)-propyl triethoxy silane, (beta-aminoethylamino)-n-propyl methyl dimethoxy silane, omega-amino-n-hexyl triethoxy silane, omega-amino-n-hexyl trimethoxy silane, omega-amino-n-hexyl methyl dimethoxy silane, as well as, in particular, gamma-amino-n-propyl trimethoxy silane, gamma-amino-n-propyl methyl dimethoxy silane, gamma-amino-n-propyl triethoxy silane, and gamma-amino-n-propyl methyl diethoxy silane.

Examples of suitable fluoro-functional organosilanes II include, among others, 3,3,3-trifluoropropyl trimethoxy silane, 3,3,3-trifluoropropyl methyl dimethoxy silane, 3,3,3-trifluoropropyl methyl dimethoxy silane, 3,3,3-trifluoropropyl cyclohexyl dimethoxy silane, 3,3,3-trifluoropropyl phenyl diethoxy silane, 3,3,3-trifluoropropyl triethoxy silane, 3,3,3,2,2-pentafluoropropyl methyl dimethoxy silane, 3,3,3-trifluoropropyloxyethyl trimethoxy silane, 3,3,3-trifluoropropyl mercaptoethyl trimethoxy silane, 3,3,3-trifluoropropyloxyethyl methyl dimethoxy silane, as well as, in particular, tridecafluoro-1,1,2,2-tetrahydrooctyl trimethoxy silane, and tridecafluoro-1,1,2, 2-tetrahydrooctyl triethoxy silane, Examples of suitable organosilanes III include n-octyl methyl dimethoxy silane, n-hexyl methyl dimethoxy silane, n-hexyl methyl diethoxy silane, n-hexyl methyl diphenoxy silane, as well as, in particular, dimethyl dimethoxy silane, dimethyl diethoxy silane, propyl methyl dimethoxy silane, and propyl methyl diethoxy silane.

Examples of suitable organosilanes IV are, among others, n-octyl trimethoxy silane, n-hexyl triethoxy silane, cyclohexyl triethoxy silane, n-propyl-tri-n-butoxy silane, n-propyl triphenoxy silane, as well as, in particular, n-propyl trimethoxy silane, n-propyl triethoxy silane, isobutyl trimethoxy silane, and isobutyl thethoxy silane.

As described above, the molar ratio is M≧0.1. The mole ratio is advantageously ≧0.5 and particularly ≧1.

According to the invention, the mixture of component I with components II, III and/or IV is mixed with water, and then with an acid as well as an alcohol, if necessary. The water causes hydrolysis of the hydrolyzable groups contained in the components, to form silanols, which cocondense, forming siloxane bridges. It is advantageous if only water is added at first, where it is practical to do so in an amount which corresponds to 0.1 to 20 times, preferably 0.2 to 2 times the molar amount of the hydrolyzable groups contained in the mixture of the various components. Their hydrolysis generally takes place at temperatures between 0° C. and 100° C., advantageously between 10 and 80° C., and particularly between 20 and 60° C. Depending on the size of the batch, a slightly elevated temperature will occur by itself within these temperature ranges, and reaction heat is preferably removed by cooling. It is practical to promote thorough mixing of the hydrolysis mixture by means of suitable measures, such as the use of a stirrer.

After hydrolysis with subsequent condensation, which can take 20 minutes to 10 hours, depending on the reactants (components), an acid as well as, if necessary, an alcohol, and additional water are added to the mixture. The acid can be used as such or in the form of an aqueous or an aqueous/alcoholic solution. Suitable acids are, among others, hydrochloric acid, nitric acid, sulfuric acid, formic acid, and acetic acid. Suitable alcohols are, for example, methanol, ethanol, propanol, isopropanol, n-butanol, i-butanol, t-butanol, or 2-methoxy ethanol as the alcohol. Of course, the components of acid, water, and alcohol can also be added separately. Before adding the acid, the alcohol that was formed by hydrolysis can be removed entirely or in part, most practically by means of distillation under atmospheric pressure or slightly reduced pressure, e.g. at 500 mbar. In this case, of course, one will generally refrain from adding alcohol.

It is practical to make the amount of acid such that a pH of 1 to 8, preferably of 3 to 6, and particularly of 3 to 5 is adjusted. The amount of water and, if applicable, the amount of alcohol, are advantageously selected in such a way that the viscosity of the reaction mixture after the oligomerization step (c) does not exceed 500,000 mPa s at 20° C., advantageously 500 mPa s, measured according to DIN 53 015, incorporated herein by reference. While reaction mixtures with a higher viscosity are also effective as agents for surface treatment, they are less easy to handle in terms of process technology. The temperature of the reaction mixtures during the addition of the acid is generally 10 to 80° C.

Instead of adding only water and then acid, as well as water and alcohol, if necessary, to the mixture of component I with components II, III and/or IV, water and acid and, if necessary, alcohol, can all be added at the same time. Furthermore, it is, of course, also possible, instead of adding water to the mixture of components, to place the mixture in water and then add acid and alcohol, if applicable, In another variant, the mixture is added to an aqueous or aqueous/alcoholic acid. However, separate addition, as described above, is preferred, because it allows better regulation of the reaction process.

The products of (b) are generally clear mixtures. If cloudiness or precipitation occurs in an individual case, this may be separated by sedimentation and/or filtration, for example by means of a decanter, a separator, a pressurized suction filter, or a similar apparatus. A preferred embodiment of the present invention involves oligomerizing the cocondensates treated with acid in step (b), in step (c), thereby increasing the particle size. The particle size distribution before and after oligomerization can be monomodal or multimodal. The average particle size d50 (=grain diameter at 50% throughput amount) of the polyorganosiloxane cocondensate is generally 0.001 to 0.02 μm before oligomerization, and preferably >0.02 μm after oligomerization, particularly 0.03 to 1 μm, determined by laser light scattering. A suitable measurement instrument is, for example, the Microtrac Ultrafine Particle Analyzer from Leeds & Northrup. At average particle sizes of about 0.02 μm, the mixtures according to the invention are opalescent. With an increasing particle size, the appearance changes in the direction of milky/cloudy. In other words, the cloudiness of a mixture increases with an increasing particle size while the solids content remains the same; this can be determined in the well-known manner using cloudiness photometers.

Presumably, other condensation reactions take place at the same time as oligomerization. The oligomerization is brought about by an appropriate combination of reaction time and reaction temperature, in the pH range indicated. At room temperature, oligomerization takes place by means of storage for several months. By using higher temperatures, the time required can be reduced accordingly. Suitable oligomerization conditions are, for example, pH 3 to 5 and 10 minutes to 5 hours at a temperature of 80° C. up to the boiling temperature of the water contained in the reaction mixture (or of the alcohol which it might contain). Before oligomerization, the reaction mixture from step (b) can be diluted with water and/or alcohol. It is practical if the concentration of the cocondensate is 0.005 to 85 wt.-% and the alcohol content is 0 to 85 wt.-%. Oligomerization can be accelerated by raising the pH to a value above 5, advantageously above 6, possibly by adding corresponding amounts of soda lye or caustic lye, sodium carbonate or potassium carbonate, ammonia, alkyl amines, or alkanol amines. Since the systems oligomerized in this way are not sufficiently stable for storage in some cases, it is practical to lower the pH again after oligomerization, to a value <6, preferably <5.

The oligomerized polyorganosiloxane cocondensates according to the invention occur, possibly after separation of coarse components, as opalescent to milky/cloudy aqueous or aqueous/alcoholic mixtures, which can be diluted with water or alcohols such as the ones mentioned above in any desired ratio, and generally do not contain any physiologically problematic ingredients and also no emulsifiers. They may be colloidal or self emulsifying systems, and are excellently suited, as was mentioned before, for giving a hydrophobic and possibly additional oleophobic finish to the most varied types of substrates, such as glass (for example in the form of plate glass, glass fibers, or glass beads), fillers and pigments, metals, polymer plastics, textile fibers (including cotton, wool, silk, as well as synthetic organic and mineral fibers), cellulose materials, such as wood or paper, as well as mineral construction materials (for example granite, marble, other natural stones, artificial stones, limes and stone, concrete, bricks, floor tiles, and ceramics). The compositions according to the invention are particularly advantageous as aids in finishing leather, leather fiber materials, and furs, demonstrating surprising advantages as compared with the aids according to the patent applications mentioned before: DE 196 49 953, 196 49 954, and 196 49 955. These older aids did result in a good beading effect, i.e. water drops and oil drops (mineral oils, thermo-oils, silicone oils) do not penetrate into the leather. But in other tests usual in the leather industry, for example the penetrometer test according to DIN 53 338, incorporated herein by reference, or the Maeser test according to ASTM D 2099-70, incorporated herein by reference, the values obtained were insufficient. In addition, the leathers finished with these aids are very hard, so that they are not suitable for applications such as the uppers of shoes, or leather for clothing. Finally, some of the older aids also have the disadvantage that the good beading effect mentioned can only be achieved by applying high temperatures, e.g. drying at a temperature clearly above 120° C. This not only results in hard leather, as was already mentioned, but can also result in scar bursting. The systems containing oligomerized polyorganosiloxane cocondensates, according to the invention, avoid or reduce these disadvantages, when they are used for leather, leather fiber materials, and furs, for example by dipping, spraying, or polishing. A particular advantage of the oligomerized polyorganosiloxane cocondensates according to the invention is that they develop their effect even at room temperature. within an acceptably short period of time. The older products intended for the same purpose, on the other hand, require higher temperatures and/or uneconomically long reaction times for the same purpose of use.

It is preferable that compositions containing the oligomerized polyorganosiloxane cocondensates are used in dilute form, so that the content of cocondensate is 0.005 to 20, particularly 0.5 to 5 wt.-%. If an alcohol, for example one of the alcohols mentioned above, or a different solvent compatible with water, for example a ketone, a glycol, a glycol ether, or a cationic or nonionic surfactant is also used to facilitate or intensify the finishing process, the content of this substance generally amounts to up to 85 wt.-%, advantageously up to 2 wt.-%.

Aside from use as a hydrophobization and possibly oleophorization agent, as well as a parting agent or a dirt-repelling coating agent, the oligomerized polyorganosiloxane cocondensates according to the invention can also be used as crosslinking agents, adhesion promoters, particularly for fluoro polymers such as Teflon®, or for paints based on fluoro polymers; as well as for additives for paints and varnishes.

Having generally described this invention, a further understanding can be obtained by reference to certain specific examples which are provided herein for purposes of illustration only and are not intended to be limiting unless otherwise specified.

EXAMPLES

Apparatus for the Production Examples

Laboratory stirring vessel reactor with inside temperature measurement device and tempering, with fluid metering device, distillation bridge with head temperature measurement device, liquification cooler and liquid presentation. Furthermore laboratory pressured suction filter with 2 L volume.

Key for Abbreviations:
DYNASYLAN® AMEO=3-aminopropyl triethoxy silane
DYNASYLAN® F 8161=tridecafluoro-1,1,2,2,-tetrahydrooctyl-1-trimethoxy silane
DYNASYLAN® F 8261=tridecafluoro-1,1,2,2,-tetrahydrooctyl-1-triethoxy silane Measurement of Average Particle Size d50

The average particle size d50 (=grain diameter at 50% throughput amount) was determined by means of laser light scattering using a Microtrac Ultrafine Particle Analyzer from the American company Leeds & Northrup. All of the parts indicated are parts by weight.

Production Examples (H Examples)

Example H1

Production of a Water-soluble Oligomerized Cocondensate of DYNASYLAN® AMEO and DYNASYLAN® F 8161

In the apparatus described above, with a 250 ml stirrer reactor, 44.2 g DYNASYLAN® AMEO and 93.4 g DYNASYLAN® F 8161 are presented, 14.4 g water are added via the metering device. The temperature increases from 20 to 30° C. as a result. The reaction mixture is stirred at 55 to 60° C. for 3 hours. Subsequently, the reaction mixture is cooled to approximately 30° C., and 11.9 g fumaric acid (85 wt.-% in water) are added within approximately 10 minutes. The temperature rises to approximately 40 to 50° C. as a result. The average particle size d50 in the clear mixture is 0.01 $\mu$m, measured after dilution of 1 part of the mixture with 9 parts water.

Oligomerization takes place in that 1 part of the reaction mixture is mixed with 9 parts water, and the mixture, with a pH of 4.5, is heated to approximately 90° C. for 1 hour. The originally clear mixture becomes opalescent. The average particle size d50 of the oligomerized polyorganosiloxane cocondensate in the opalescent mixture is 0.03 $\mu$m.

Example H2

Production of a Water-soluble Oligomerized Cocondensate of DYNASYLAN® AMEO and DYNASYLAN® F 8261

In the apparatus described above, with a 4,000 ml stirrer reactor, 1326 g DYNASYLAN® AMEO and 1530 g DYNASYLAN® F 8261 are presented. 162 g water are added via the metering device. The temperature increases from 20 to 30° C. as a result. The reaction mixture is stirred at 55 to 60° C. for 3 hours. Subsequently, the reaction mixture is cooled to approximately 30° C. 357 g fumaric acid (85 wt.-% in water) are added within approximately 20 minutes. The temperature rises to approximately 40 to 50° C. as a result.

Oligomerization takes place in that 1 part of the reaction mixture is mixed with 9 parts water, and the mixture, with a pH of 4.5, is heated to approximately 96° C. (boiling under reflux) for 1 hour. The average particle size d50 of the polyorganosiloxane cocondensate in the opalescent liquid is 0.063 $\mu$m.

Example H3

Production of a Water-soluble Oligomerized Cocondensate of DYNASYLAN® AMEO and DYNASYLAN® F 8261

In the apparatus described above, with a 4,000 ml stirrer reactor, 1326 g DYNASYLAN® AMEO and 1530 g DYNASYLAN® F 8261 are presented. 162 g water are added via the metering device. The temperature increases from 20 to 30° C. as a result. The reaction mixture is stirred at 55 to 60° C. for 3 hours. Subsequently, the reaction mixture is cooled to approximately 30° C., and 357 g fumaric acid (85 wt.-% in water) are added within approximately 20 minutes. The temperature rises to approximately 40 to 50° C. as a result, Oligomerization takes place in that 3 parts of the reaction mixture are mixed with 7 parts water, and the mixture, with a pH of 4.5, is heated to approximately 91° C. (boiling under reflux) for 1 hour. The originally clear mixture becomes milky/cloudy. The average particle size d50 of the polyorganosiloxane cocondensate in the milky/cloudy mixture is 0.192 μm.

Example H4

Production of a Water-soluble Cocondensate of DYNASYLAN® AMEO, propyl methyl dimethoxy silane and propyl trimethoxy silane, oligomerized by storage at room temperature 265.2 g DYNASYLAN® AMEO, 88.8 g propyl methyl dimethoxy silane and 98.4 g propyl trimethoxy silane are presented. 86.4 g water are metered in within 10 minutes. The temperature increases from 25 to 50° C. as a result. The reaction mixture is stirred at 60° C. for 2 hours. Subsequently, 136 g of the alcohol formed due to hydrolysis are distilled off. 274 g water and 72.3 g fumaric acid (85 wt.-% in water) are mixed, and the mixture is metered in within 15 minutes, resulting in a slight temperature increase. Subsequently, a ternary methanol/ethanol/water mixture is distilled. At the same time, water is added to the same extent that the mixture is distilled off, so that the volume of the reaction mixture remains constant. The distillation is terminated when only water is distilled off. The reaction mixture is completely clear and is aged at room temperature for 6 months, for the purpose of oligomerization. Measurement of the cloudiness that occurs, using a cloudiness photometer according to DIN EN 27 027, incorporated herein by reference, yields a value of 98 TE/F. The cloudiness shows a significant increase in particle size. However, no sedimentation phenomena occur; this supports the assumption that a stable system is present,

Example H5

Production of a water-soluble cocondensate of DYNASYLAN® AMEO, propyl methyl dimethoxy silane and propyl trimethoxy silane, oligomerized at elevated temperature 265.2 g DYNASYLAN® AMEO, 88.8 g propyl methyl dimethoxy silane and 98.4 g propylthmethoxy silane are presented. 86.4 g water are metered in within 10 minutes. The temperature increases from 25 to 50° as a result. The reaction mixture is stirred at 60° C. for 2 hours. Subsequently, 136 g of the alcohol formed due to hydrolysis are distilled off. 274 g water and 72.3 g fumaric acid (85 wt.-% in water) are mixed, and the mixture is metered in within 15 minutes, resulting in a slight temperature increase. Subsequently, a ternary methanol/ethanol/water mixture is distilled. At the same time. water is added to the same extent that the mixture is distilled off, so that the volume of the reaction mixture remains constant. The distillation) is terminated when only water is distilled off. The reaction mixture is completely clear and is heated to 90° C. for 6 hours, for the purpose of oligomerization. Measurement of the cloudiness that occurs, using a cloudiness photometer according to DIN EN 27 027, yields a value of 166 TE/F. The cloudiness shows a significant increase in particle size. However, no sedimentation phenomena occur; this supports the assumption that a stable system is present.

Example H6

Production of a water-soluble cocondensate of DYNASYLAN® AMEO, propyl methyl dimethoxy silane and propyl trimethoxy silane, oligomerized at a modified pH 265.2 g DYNASYLAN® AMEO, 88.8 g propyl methyl dimethoxy silane and 98.4 g propyl dimethoxy silane are presented. 86.4 g water are metered in within 10 minutes. The temperature increases from 25 to 50° C. as a result. The reaction mixture is stirred at 60° C. for 2 hours. Subsequently, 136 g of the alcohol formed due to hydrolysis are distilled off. 274 g water and 72.3 g fumaric acid (85 wt.-% in water) are mixed, and the mixture is metered in within 15 minutes, resulting in a slight temperature increase. Subsequently, a ternary methanol/ethanol/water mixture is distilled. At the same time, water is added to the same extent that the mixture is distilled off, so that the volume of the reaction mixture remains constant. The distillation is terminated when only water is distilled off. The reaction mixture is completely clear and has a pH of 4.5 By adding dilute ammonia solution, the pH is adjusted to 6.5. Measurement of the cloudiness that occurs within one hour, using a cloudiness photometer according to DIN EN 27 027, yields a value of 98 TE/F. The pH is adjusted back to 4.5, by means of dilute fumaric acid. The cloudiness shows a significant increase in particle size. However, no sedimentation phenomena occur; this supports the assumption that a stable system is present.

Example H7 (Comparative Example)

Production of a water-soluble, non-oligomerized cocondensate of DYNASYLAN® AMEO and DYNASYLAN F 8261

In the apparatus described above, with a 4,000 ml stirrer reactor, 1326 g DYNASYLAN® AMEO and 1530 g DYNASYLAN® F 8261 are presented. 162 g water are added via the metering device. The temperature increases from 20 to 30° C. as a result. The reaction mixture is stirred at 55 to 60° C. for 3 hours. Subsequently, the reaction mixture is cooled to approximately 30° C. 357 g fumaric acid (85 wt.-% in water) are added within approximately 20 minutes. The temperature rises to approximately 40 to 50° C. as a result. In the completely transparent solution, which does not appear cloudy to the eye, a particle size d50 of the polyorganosiloxane cocondensate of 0.010 is measured (after dilution of 1 part of the mixture with 9 parts water),

Example H8 (Comparative Example)

Production of a water-soluble, non-oligomerized cocondensate of DYNASYLAN® AMEO, propyl methyl dimethony silane and propyl trimethoxy silane 265.2 g DYNASYLAN® AMEO, 88.8 g propyl methyl dimethoxy silane and 98.4 g propyl trimethoxy silane are presented. 86.4 g water are metered in within 10 minutes. The temperature increases from 25 to 50° C. as a result. The reaction mixture is stirred at 60° C. for 2 hours. Subsequently, 136 g of the alcohol formed due to hydrolysis are distilled off. 274 g water and 72.3 g fumaric acid (85 wt.-% In water) are mixed, and the mixture is metered in within 15 minutes, resulting in a slight temperature increase. Subsequently, a ternary methanol/ethanol/water mixture is distilled. At the same time, water is added to the same extent that the mixture is distilled off, so that the volume of the reaction mixture remains constant. The distillation is terminated when only water is distilled off. After dilution to a content of 20 wt.-%, with reference to the alkoxy silanes used, the reaction mixture is completely clear to the eye and can be diluted with water in any ratio. Measurement of the cloudiness that occurs with a cloudiness photometer, according to DIN EN 27 027, yields a value of 2.4 TE/F.

Application Examples (A examples)

Example A1

Treatment of Mineral Surfaces with Oligomerized Polyorganosiloxane Cocondensate from Examples H1, H2, and H3

Bricks, lime-sandstone, and concrete were cut into cubes with an edge length of approximately 5 cm and dipped into the aqueous oligomerization mixture according to the invention from Examples H1, H2, or H3, which mixture had been diluted with water in such a way that the concentration of polyorganosiloxane cocondensate corresponded to a calculated concentration of fluoroalkyl trialkoxy silane of 0.5 wt.-% being used. for approximately 5 minutes. After the stones were dried at room temperature or in a drying cabinet at approximately 120° C., water applied to the surface of the stones, as well as oil (mineral oil, thermo-oil Marlothem S, or silicone oil) no longer penetrates into the surface of the construction materials. The beading effect for the stated liquids is very good. In the case of untreated samples, the stated liquids immediately penetrate into the surface. The oligomerized polyorganosiloxane cocondensates are therefore suitable for simultaneous hydrophobization and oleophorization of mineral construction materials.

Example A2

Treatment of Mineral Surfaces with Oligomerized Polyorganosiloxane Cocondensate from Examples H1, H2, and H3

The method of procedure is the same as in Example A1, but the oligomerization mixture of Examples H1, H2, or H3 is diluted in such a way that the concentration of polyorganosiloxane cocondensate corresponds to a calculated concentration of fluoroalkyl trialkoxy silane of 5 wt.-% being used. The beading effects for water and oil correspond to the effects of Example A1.

Example A3

Treatment of Mineral Surfaces with Oligomerized Polyorganosiloxane Cocondensate from Examples H1, H2, and H3

The method of procedure is the same as in Example A1, but the oligomerization mixture of Examples H1, H2, or H3 is diluted in such a way that the concentration of polyorganosiloxane cocondensate corresponds to a calculated concentration of fluoroalkyl trialkoxy silane of 0.01 wt.-% being used. The beading effects for water and oil correspond to the effects of Example A1.

Example A4

Treatment of Mineral Surfaces with Oligomerized Polyorganosiloxane Cocondensate from Examples H1, H2, and H3

The method of procedure is the same as in Example A1, but the oligomerization mixture of Examples H1, H2, or H3 is diluted with water in such a way that the concentration of polyorganosiloxane cocondensate corresponds to a calculated concentration of fluoroalkyl alkoxy silane of 0.005 wt.-% being used. After drying at approximately 120° C., water and oil penetrate into the surface of the construction materials after several minutes. The beading effects for the stated liquids are still present, but are only weakly marked and of short duration.

Example A5

Treatment of Mineral Surfaces with Oligomerized Polyorganosiloxane Cocondensate from Examples H1, H2, and H3

The method of procedure is the same as in Example A1, but the oligomerization mixture of Examples H1, H2, or H3 is diluted so much with water that the concentration of polyorganosiloxane cocondensate corresponds to a calculated concentration of fluoroalkyl alkoxy silane of 0.0001 wt.-% being used. After drying at approximately 120° C., water and oil penetrate into the surface of the construction materials soon after being applied. There is practically no beading effect for the stated liquids to be observed any longer.

Example A6

Treatment of Cotton with Oligomerized Polyorganosiloxane Cocondensate from Examples H1, H2, and H3

Cotton fabric was cut into squares with an edge length of approximately 5 cm and the square pieces were dipped into an aqueous oligomerization mixture according to the invention from Examples H1, H2, or H3, which mixture had been diluted with water in such a way that the concentration of polyorganosiloxane cocondensate corresponded to a calculated concentration of fluoroalkyl alkoxy silane of 1.0 wt.-% being used, for approximately 5 minutes. After the fabric pieces were dried at room temperature, water applied to the surface of the fabric pieces, as well as oil (mineral oil, thermo-oil Marlothem S, or silicone oil) no longer penetrates into the surface of the fabric pieces. The beading effect for the stated liquids is very good. In the case of untreated samples, the stated liquids immediately penetrate into the surface. The oligomerized polyorganosiloxane cocondensates are therefore suitable for simultaneous hydrophobization and oleophobization of cotton.

Example A7

Treatment of Wood with Oligomerized Polyorganosiloxane Cocondensate from Examples H1, H2, and H3

A wood panel with a thickness of approximately 0.5 cm was cut into rectangles with an edge length of approximately 3×5 cm and the wood pieces were dipped into an aqueous oligomerization mixture according to the invention from Examples H1, H2, or H3, which mixture had been diluted with water in such a way that the concentration of polyorganosiloxane cocondensate corresponded to a calculated concentration of fluoroalkyl alkoxy silane of 1.0 wt.-% being used, for approximately 5 minutes. After the wood pieces were dried at room temperature, water applied to the surface of the wood pieces, as well as oil (mineral oil, thermo-oil Marlothem S, or silicone oil) no longer penetrates into the surface of the wood pieces. The beading effect for the stated liquids is very good. In the case of untreated samples, the stated liquids immediately penetrate into the surface, The oligomerized polyorganosiloxane cocondensates are therefore suitable for simultaneous hydrophobization and oleophobization of wood, Example A8

Treatment of Paper with Oligomerized Polyorganosiloxane Cocondensate from Examples H1, H2, and H3

Paper tissues were cut into pieces with an edge length of approximately 5 cm and dipped into an aqueous oligomerization mixture according to the invention from Examples H1, H2, or H3, which mixture had been diluted with water in such a way that the concentration of polyorganosiloxane cocondensate corresponded to a calculated concentration of fluoroalkyl alkoxy silane of 1.0 wt.-% being used, for approximately 5 minutes. After the paper pieces were dried at room temperature, water applied to the surface of the paper pieces, as well as oil (mineral oil, thermo-oil Marlothem S, or silicone oil) no longer penetrates into the surface of the paper pieces. The beading effect for the stated liquids is very good. In the case of untreated samples, the stated liquids immediately penetrate into the surface. The oligomerized polyorganosiloxane cocondensates are therefore suitable for simultaneous hydrophobization and oleophorization of paper.

Example A9

Treatment of Glass with Oligomerized Polyorganosiloxane Cocondensate from Examples H1, H2, and H3

Sheets of glass with an edge length of approximately 10×20 cm were dipped into an aqueous oligomerization mixture according to the invention from Examples H1, H2, or H3, which mixture had been diluted with water in such a way that the concentration of polyorganosiloxane cocondensate corresponded to a calculated concentration of fluoroalkyl alkoxy silane of 1.0 wt.-% being used, for approximately 5 minutes. After the glass pieces had been allowed to drip off and dry at room temperature, water applied to the surface of the glass sheets, as well as oil (mineral oil, thermo-oil Marlothem S, or silicone oil) clearly beads up. The edge angle for the stated liquids is >90°. In the case of untreated samples, the edge angle is clearly <90°. The oligomerization mixture leaves a film on the glass and is suitable for simultaneous hydrophobization and oleophorization of glass. After boiling water is allowed to act on the treated sheets of glass for 5 hours, no significant change in the edge angle is determined when a drop of water is applied to the glass surface.

Example A10

Treatment of Metal Surfaces with Oligomerized Polyorganosiloxane Cocondensate from Examples H1, H2, and H3

Steel plates with a thickness of approximately 1 mm, which were sandblasted, as well as pieces of aluminum foil, with an edge length of approximately 10×20 cm, were dipped into the aqueous oligomerization mixture according to the invention from Examples H1, H2, or H3, which mixture had been diluted with water in such a way that the concentration of polyorganosiloxane cocondensate corresponded to a calculated concentration of fluoroalkyl alkoxy silane of 1.0 wt.-% being used, for approximately 5 minutes. After the steel pieces had been allowed to drip off and dry at room temperature, water applied to the surface of the steel pieces, as well as oil (mineral oil, thermo-oil Marlothem S, or silicone oil) clearly beads up. The product produces a film on the metal surface, The visually assessed edge angles are clearly higher for the treated metal samples than for the untreated ones. Storage of coated and uncoated steel plates in aqueous hydrochloric acid results in clearly lower corrosion for the steel plates coated with aqueous oligomerization mixture. Liquid thermoplastic PE plastic applied to the coated steel plates no longer adheres to the steel plate, in contrast to uncoated steel plates. The polyorganosiloxane cocondensates are therefore suitable as parting agents. for example for an anti-adhesion finish on extruder screws.

Example A11

Treatment of Plastic Surfaces with Oligomerized Polyorganosiloxane Cocondensate from Examples H1, H2, and H3

Sheets of plastic with a thickness of approximately 1 mm, made of polymethyl methacrylate, polyvinyl chloride, polyethylene, polypropylene, polystyrene, and polyamide 6 were dipped into the aqueous oligomerization mixture according to the invention from Examples H1, H2, or H3, which mixture had been diluted with water in such a way that the concentration of polyorganosiloxane cocondensate corresponded to a calculated concentration of fluoroalkyl alkoxy silane of 1.0 wt.-% being used, for approximately 5 minutes. After the small sheets of plastic had been allowed to drip off and dry at room temperature, water applied to the surface of the plastic pieces, as well as oil (mineral oil, thermo-oil Madotherm S, or silicone oil) clearly beads up. The beading effect for the stated liquids is very good. In the case of untreated samples, the edge angle is clearly lower, according to a visual assessment. The oligomerized polyorganosiloxane cocondensates are therefore suitable for simultaneous hydrophobization and oleophobization of plastic surfaces.

Example A12

Treatment of Car Finish Surfaces with Oligomerized Polyorganosiloxane Cocondensate from Examples H1, H2, and H3

Car finish surfaces were sprayed with the aqueous oligomerization mixture according to the invention from Examples H1, H2, or H3, which mixture had been diluted with water in such a way that the concentration of polyorganosiloxane cocondensate corresponded to a calculated concentration of fluoroalkyl alkoxy silane of 1.0 wt.-% being used. After approximately 15 minutes, a permanent water beading effect is demonstrated on the finish surface. Dirt can be removed more easily than from untreated finish surfaces. The coating was permanent and survived a period of vehicle operation of half a year, without follow-up treatment being required. The polyorganosiloxane cocondensates are therefore suitable as a dirt-repelling finish on painted surfaces, for example on cars, trucks, railway cars, machines, facades, and the like, for interior and exterior use.

Example A13

Treatment of Mineral Facade Elements with Oligomerized Polyorganosiloxane Cocondensate from Examples H1, H2, and H3

Polished granite, marble, sandstone, artificial stone, and ceramic tiles were sprayed with the aqueous oligomerization mixture according to the invention from Examples H1, H2, or H3, which mixture had been diluted with water in such a way that the concentration of polyorganosiloxane coconden- sate corresponded to a calculated concentration of fluoro- alkyl alkoxy silane of 1.0 wt.-% being used. Beads which formed on the surface were removed with a rubber squeegee. After the surfaces dried, there was a dear beading effect with regard to drops of oil and water that were applied, as compared with untreated surfaces. Oil and water no longer penetrated into the porous substrates. The surfaces were easier to clean after having become dirty. The oligomerized polyorganosiloxane cocondensates are therefore suitable as a dirt-repelling finish on facades, walls, floors, and the like.

Example A14

Treatment of Chrome-tanned Leather with Oligomerized Polyorganosiloxane Cocondensate from Examples H1, H2, and H3

Chrome-tanned leather, which was not pre-treated in any other way, was dipped into an aqueous oligomerization mixture according to the invention from Examples H1, H2, or H3, which mixture had been diluted with water in such a way that the concentration of polyorganosiloxane coconden- sate corresponded to a calculated concentration of fluoro- alkyl alkoxy silane of 1.0 wt.-% being used, for approxi- mately 5 minutes. After the leather pieces were dried at room temperature (2 days), water applied to the surface of the leather pieces, as well as oil (mineral oil, thermo-oil Madot- herm S, or silicone oil) no longer penetrates into the surface of the leather pieces. The beading effect for the stated liquids is very good. In the case of untreated samples, the stated liquids immediately penetrate into the surface. The oligo- merized polyorganosiloxane cocondensate is therefore suit- able for simultaneous hydrophobization and oleophorization of leather.

Example A15

Treatment of Leather with the Oligomerized Polyorganosiloxane Cocondensate from Example H2, in Combination with a Greasing Agent A chrome-tanned leather in the wet-blue stage, with a shave thickness of 1.8 to 2.0 mm, was used. The treatment was carried out by dipping the leather into the aqueous baths indicated in the table below. The leather pieces, with a DIN A3 size, were dried in a drying cabinet. To perform the Maeser tests, two leather pieces which fit into the Maeser apparatus were cut from a piece of leather with the DIN A3 size.

| Step | Composition of the bath (wt. - %, with reference to the shave weight) | Dilution with water before addition to bath | Temper- ature (° C.) | Time (time cumu- lative) (min) |
|---|---|---|---|---|
| Retan | 200 water | | 45 | |
| | 2 Chromosal B (Bayer AG) | | | 15 60 |
| | 2 Blancorol RC (Bayer AG) | | | (75) |
| Drain bath Neutralize/ retan | 100 water 1.0 sodium formate 0.7 sodium bicarbonate | 1:10 | 35 | 30 60 (90) |
| Drain bath Wash | 300 water | | 50 | 10 |
| Drain bath Grease | 100 water 0.5 ammonia 10.0 Coripol BZN* 1.5 formic acid | 1:5 1:4 1:5 | 50 60 | 5 90 10 20 (125) |
| Drain bath Wash 2X | 300 water | | 20 | 10 |
| Drain bath Treat with siloxane | 20 polyorganosiloxane cocondensate from Example H2 | 1:10 | 20 | 90 |
| Drain bath Dry | | | 80 | 180 |

*Product of TLF Ledertechnik GmbH & co. KG

The leather treated in this way was subjected to the Maeser test in accordance with ASTM D 2099-70. Water penetration took place after 11,200/11,000 bending steps (values for two different test elements). Two comparison samples not treated with the polyorganosiloxane cocondensate demonstrated water penetration after 700 and 1,200 bending steps, respec- tively. The test for oil repellence according to AATCC 118 (Bibliothek des Leders [Leather Library], Vol. 10, pages 148 ff, (1982)) resulted in Level 0 without treatment with the polyorganosiloxane cocondensate (no oil repellence), and Level 1 with treatment. The oligomerized polyorganosilox- ane cocondensate is therefore suitable for simultaneous hydrophobization and oleophorization of leather.

Example A16

Treatment of Leather with the Oligomerized Polyorganosiloxane Cocondensate from Example H2, in Combination with a Hydrophobization Agent A chrome-tanned leather in the wet-blue stage, with a shave thickness of 1.8 to 2.0 mm, was used. The treatment was carried out by dipping the leather into the aqueous baths indicated in the table below. The leather pieces, with a DIN A3 size, were dried in a drying cabinet. To perform the Maeser tests, two leather pieces which fit into the Maeser apparatus were cut from a piece of leather with the DIN A3 size.

| Step | Composition of the bath (wt. - %, with reference to the shave weight) | Dilution with water before addition to bath | Temperature (° C.) | Time (time cumulative) (min) |
|---|---|---|---|---|
| Retan | 200 water | | 45 | |
| | 2 Chromosal B (Bayer AG) | | | 15 |
| | 2 Blancorol RC (Bayer AG) | | | 60 (75) |
| Drain bath | | | | |
| Neutralize/ retan | 100 water | | 35 | |
| | 1.0 sodium formiate | | | 30 |
| | 0.7 sodium bicarbonate | 1:10 | | 60 (90) |
| | 3.0 Magopal FN* | 1:3 | | |
| | 3.0 Mimosa | | | |
| | 3.5 Irgatan FB fl.* | 1:2 | | 60 (150) |
| Drain bath | | | | |
| Wash | 300 water | | 50 | 10 |
| Hydro- phobize | 100 water | | 50 | 5 |
| | 0.5 ammonia | 1:5 | | 90 |
| | 10.0 Eupilon WAS-1* | 1:4 | 60 | 10 |
| | 1.5 formic acid | 1:5 | | 20 (125) |
| Drain bath | | | | |
| Wash | 300 water | | 20 | 10 |
| Fix | 100 water | | 35 | |
| | 3.0 Chromosal B (Bayer AG) | | | 90 |
| Drain bath | | | | |
| Wash 2X | 300 water | | 20 | 10 |
| Drain bath | | | | |
| Treat with siloxane | 20 polyorganosiloxane cocondensate from Example H2 | 1:10 | 20 | 90 |
| Drain bath | | | | |
| Dry | | | 80 | 180 |

*Product of TLF Ledertechnik GmbH & co. KG

The leather treated in this way was subjected to the Maeser test in accordance with ASTM D 2099-70. The test was stopped after no water penetration took place even after 171,000 bending steps. Two comparison samples not treated with the polyorganosiloxane cocondensate demonstrated water penetration after 67,800 bending steps. The test for oil repellence according to AATCC 118 (Bibliothek des Leders [Leather Library], Vol. 10, pages 148 ff. (1982)) resulted in Level 0 without treatment with the polyorganosiloxane cocondensate (no oil repellence), and Level 2 with treatment. The oligomerized polyorganosiloxane cocondensate is therefore suitable for simultaneous hydrophobization and oleophorization of leather.

Example A17

Treatment of Leather with the Oligomerized Polyorganosiloxane Cocondensate from Example H2, in Combination with a Different Hydrophobization Agent, but without Mineral Salt The work was carried out as in Example A16, but without fixing using 3 wt.-% Chromosal B. In spite of the fact that the conditions were disadvantageous for hydrophobization (the hydrophobization agent Eupilon WAS-1 is only activated during the fixing process), penetration of water in the Maeser test took place after 20,500/39,800 bending steps for two sample pieces. In the case of two sample pieces without treatment with the polyorganosiloxane cocondensate according to the invention, water already penetrated after only 12,300/12,300 bending steps.

Example A18

Treatment of Vegetable-tanned Leather with the Oligomerized Polyorganosiloxane Cocondensate from Example H2

Commercially available vegetable-tanned leather (manufactured by Hamann GmbH, Mülheim) was dipped into the aqueous oligomerization mixture according to the invention, of Example H2, for 10 minutes; this mixture had been diluted with water in such a way that the concentration of polyorganosiloxane cocondensate corresponded to a calculated concentration of fluoroalkyl alkoxy siloxane of 2.0 wt.-%. After drying at 80° C., the leather was clamped into a cylinder and a water column with a height of approximately 10 cm was applied. After 4 hours, no water penetration had been observed.

Example A19 (Comparative Example)

Treatment of Cotton with the Product from Example H7

Cotton fabric was cut into squares with an edge length of approximately 5 cm and the square pieces were dipped into the aqueous solution of the polyorganosiloxane cocondensate according to Example H7, which had been diluted with water in such a way that the concentration of polyorganosiloxane cocondensate corresponded to a calculated concentration of fluoroalkyl alkoxy silane of 1.0 wt.-%, for approximately 5 minutes. Immediately after the fabric pieces were dried at room temperature, water applied to the surface of the fabric pieces, as well as oil (mineral oil, thermo-oil Marlothem S, or silicone oil) penetrates into the fabric. A hydrophobic and oleophobic effect is only observed after several days of storage at room temperature. The effect does not reach such the extent that is reached in the treatment with the i)polyorganosiloxane cocondensate according to Example A6.

Example A20 (Comparative Example)

Treatment of Wood with the Product from Example H7

A wood panel with a thickness of approximately 0.5 cm was cut into rectangles with an edge length of 3×5 cm, and the rectangles were dipped into the aqueous solution of the polyorganosiloxane cocondensate according to Example H7, which had been diluted with water in such a way that the concentration of polyorganosiloxane cocondensate corresponded to a calculated concentration of fluoroalkyl alkoxy silane of 1.0 wt.-%, for approximately 5 minutes. Immediately after the wood pieces were dried at room temperature, water applied to the surface, as well as oil (mineral oil, thermo-oil Marlothem S, or silicone oil) penetrates into the wood. A hydrophobic and oleophobic effect is only observed after several days of storage at room temperature. The effect does not reach such the extent that is reached in the treatment with the polyorganosiloxane cocondensate according to Example A7.

Example A21 (Comparative Example)

Treatment of Paper with the Product from Example H7

Paper tissues were cut into square pieces with an edge length of approximately 5 cm, and the pieces were dipped into the aqueous solution of the polyorganosiloxane cocondensate according to Example H7, which had been diluted with water in such a way that the concentration of polyorganosiloxane cocondensate corresponded to a calculated concentration of fluoroalkyl alkoxy silane of 1.0 wt.-%, for approximately 5 minutes. Immediately after the paper pieces were dried at room temperature, water applied to the surface, as well as oil (mineral oil, thermo-oil Marlothem S, or silicone oil) penetrates into the paper. A hydrophobic and oleophobic effect is only observed after several days of storage at room temperature. The effect does not reach such the extent that is reached in the treatment with the polyorganosiloxane cocondensate according to Example A9.

Example A22 (Comparative Example)

Treatment of glass with the product from Example H7

Sheets of glass with an edge length of 10×20 cm were dipped into the aqueous solution of the polyorganosiloxane cocondensate according to Example H7, which had been diluted with water in such a way that the concentration of polyorganosiloxane cocondensate corresponded to a calculated concentration of fluoroalkyl alkoxy silane of 1.0 wt.-%, for approximately 5 minutes. Immediately after the sheets of glass had been allowed to drip off and dry at room temperature, water applied to the surface, as well as oil (mineral oil, thermo-oil Madotherm S, or silicone oil) clearly beads up. The edge angle is >90° for the stated liquids. In the case of untreated glass, the edge angle is clearly [word missing] than 90°. The product leaves a film on the glass, and is suitable for simultaneous hydrophobization and oleophorization of glass.

After the treated sheets of glass are boiled in water for 5 hours, a significant decrease in the edge angle is found when water or oil is applied. Therefore the product is not resistant to the attack of moisture, as opposed to the polyorganosiloxane cocondensate according to the invention used in Example A9.

Example A23 (Comparative Example)

Treatment of Leather with the Product from Example H7

Untreated, chrome-tanned leather was dipped into the aqueous solution of the polyorganosiloxane cocondensate according to Example H7, which had been diluted with water in such a way that the concentration of polyorganosiloxane cocondensate corresponded to a calculated concentration of fluoroalkyl alkoxy silane of 1.0 wt.-%, for approximately 5 minutes. Immediately after the leather was dried at room temperature, water applied to the surface of the fabric pieces, as well as oil (mineral oil, thermo-oil Madotherm S, or silicone oil) penetrates into the leather. A hydrophobic and oleophobic effect is not observed even after several days of storage at room temperature.

Example A24 (Comparative Example)

Treatment of Leather with the Products from Examples H4, H5, H6

Untreated, chrome-tanned leather was dipped into aqueous solutions of the polyorganosiloxane cocondensate according to Examples H4, H5, and H6, respectively, each of which had been diluted with water in such a way that the concentration of polyorganosiloxane cocondensate corresponded to a calculated concentration of silanes of 1.0 wt.-% being used, for approximately 5 minutes. After the leather pieces were dried at room temperature for 7 days, water applied to the surface no longer penetrates into the leather, A clear beading effect is observed. The products are therefore suitable for hydrophobization of leather.

Example A25 (Comparative Example)

Treatment of Leather with the Product from Example H7

Untreated, chrome-tanned leather was dipped into the aqueous solution of the polyorganosiloxane cocondensate according to Example H7, which had been diluted with water in such a way that the concentration of polyorganosiloxane cocondensate corresponded to a calculated concentration of fluoroalkyl alkoxy silane of 1.0 wt.-%, for approximately 5 minutes. After 7 days of storage at room temperature, water applied to the surface penetrates into the leather. A hydrophobic surface effect is only observed after the leather is tempered at 150 "C. Because of the high temperature, however, a loss of quality occurs, which is expressed in scar ruptures, for example. The beading behavior, even after tempering, is clearly poorer than for the example according to the invention, A24.

Example A26 (Comparative Example)

Treatment of Cotton with the Products from Examples H4, H5, H6

Cotton was cut into squares with an edge length of 5 cm, and the squares were dipped into aqueous solutions of the polyorganosiloxane cocondensate according to Examples H4, H5, and H6, respectively, each of which had been diluted with water in such a way that the concentration of polyorganosiloxane cocondensate corresponded to a calculated concentration of silanes of 1.0 wt.-% being used, for approximately 5 minutes. Two days after the fabric pieces were dried at room temperature, water applied to the surface no longer penetrates into the fabric. A clear beading effect is observed. The product is therefore suitable for hydrophobization of cotton.

Example A27 (Comparative Example)

Treatment of Cotton with the Product from Example H8

Cotton fabric was cut into squares with an edge length of approximately 5 cm and the squares were dipped into the aqueous solution of the polyorganosiloxane cocondensate according to Example H8, which had been diluted with water in such a way that the concentration of polyorganosiloxane cocondensate corresponded to a calculated concentration of silanes of 5 wt.-% being used, for approximately 5 minutes. Two days after the fabric pieces were dried at room temperature, water applied to the surface of the fabric pieces penetrates into the fabric. A hydrophobic surface effect is only observed after the impregnated fabric is tempered at 150° C. This causes the (originally white) fabric to become slightly yellowish. The beading behavior is clearly poorer than in Example A26, even after tempering. The product is therefore not suited for hydrophobization of cotton.

Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 19823390.6, filed on May 26, 1998, and incorporated herein by reference in its entirety.

What is claimed is:

1. An oligomerized organopolysiloxane cocondensate, obtained by (a) mixing at least one water-soluble amino-functional organosilane represented by formula I:

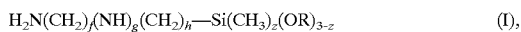

$$H_2N(CH_2)_f(NH)_g(CH_2)_h-Si(CH_3)_z(OR)_{3-z} \quad (I),$$

wherein f is equal to 0 or a whole number from 1 to 6; g is equal to 0 if f is equal to 0, and g is equal to 1 if f is not equal to 0; h is a whole number from 1 to 6, z is 0, 1, 2, and R is a linear, branched, or cyclic alkyl group with 1 to 8 C atoms or an aryl group, with at least one member selected from the group consisting of a fluoro-functional organosilane represented by formula II, an organosilane represented by III, and an organosilane represented by formula IV:

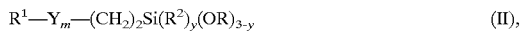

$$R^1-Y_m-(CH_2)_2Si(R^2)_y(OR)_{3-y} \quad (II),$$

wherein $R^1$ is a monofluoridated, oligofluoridated, or perfluoridated alkyl group with 1 to 9 C atoms or a monofluoridated, oligofluoridated, or perfluoridated aryl group, Y is a —CH$_2$—, —O—, or —S— group, $R^2$ is a linear, branched, or cyclic alkyl group with 1 to 8 C atoms or an aryl group, and R is a linear, branched, or cyclic alkyl group with 1 to 8 C atoms or an aryl group, y is 0 or 1, and m is 0 or 1,

$$R^3-Si(CH_3)(OR)_2 \quad (III),$$

$$R^3-Si(OR)_3 \quad (IV),$$

wherein in formula III and formula IV, $R^3$, independently in each instance, is a linear, branched, or cyclic alkyl group with 1 to 8 C atoms, R, independently in each instance, is a linear, branched, or cyclic alkyl group with 1 to 8 C atoms or an aryl group, in the molar ratio $M=[a/(b+c+d)]\geq 0.1$, wherein a is the sum of the mole numbers of the organosilane represented by formula I, b, if applicable, is the sum of the mole numbers of the organosilane represented by formula II, c, if applicable, is the sum of the mole numbers of the organosilane represented by formula III, and d, if applicable, is the sum of the mole numbers of the organosilane represented by formula IV;

(b) mixing the mixture from (a) with water and with an acid and, optionally, with an alcohol, to obtain a cocondensate, and (c) oligomerizing the cocondensate to increase the particle size thereof.

2. The cocondensate of claim 1, in the form of an aqueous or aqueous/alcoholic solution with a pH of 1 to 8.

3. The cocondensate of claim 1, in the form of an aqueous or aqueous/alcoholic solution with a pH of 3 to 6.

4. The cocondensate of claim 1, in the form of an aqueous or aqueous/alcoholic solution with a pH of 3 to 5.

5. The cocondensate of claim 2, which contains 0.005 to 85 wt.-% of the cocondensate.

6. The cocondensate of claim 1, wherein particles which cause cloudiness have been separated.

7. The cocondensate of claim 1, wherein the acid in (b) is a monofunctional inorganic or organic acid.

8. The cocondensate of claim 1, wherein the mean particle size, d50, of the oligomerized polyorganosiloxane condensate particles is >0.02 μm.

9. The cocondensate of claim 1, wherein the mean particle size, d50, of the oligomerized polyorganosiloxane condensate particles is 0.03 to 1 μm.

10. The cocondensate of claim 1, wherein the fluoro-functional organosilane represented by formula II is mixed with the water-soluble amino-functional organosilane represented by formula I.

11. The cocondensate of claim 1, wherein the fluoro-functional organosilane represented by formula II and the organosilane represented by III are mixed with the water-soluble amino-functional organosilane represented by formula I.

12. The cocondensate of claim 1, wherein the fluoro-functional organosilane represented by formula II, the organosilane represented by III, and the organosilane represented by formula IV are mixed with the water-soluble amino-functional organosilane represented by formula I.

13. A method of making the oligomerized organopolysiloxane cocondensate of claim 1, comprising (a) mixing the water-soluble amino-functional organosilane represented by formula I with at least one member selected from the group consisting of the fluoro-functional organosilane represented by formula II, the organosilane represented by III, and the organosilane represented by formula IV, wherein the molar ratio $M=[a/(b+c+d)]\geq 0.1$;

(b) mixing the mixture from (a) with water and with an acid and, optionally, with an alcohol, to produce a cocondensate; and (c) oligomerizing the cocondensate from (b), thereby increasing the particle size thereof.

14. A method of coating surfaces, comprising applying the organopolysiloxane cocondensate of claim 1 to a surface.

15. The method of claim 14, wherein the applied coating is hydrophobic.

16. The method of claim 14, wherein the applied coating is hydrophobic and oleophobic.

17. The method of claim 14, wherein the applied coating provides a dirt-repelling finish on the surface.

* * * * *